April 7, 1970 C. J. CAMPAGNUOLO ET AL 3,504,691

FLUIDIC OSCILLATORY SYSTEM INSENSITIVE TO PRESSURE AND TEMPERATURE

Filed Nov. 18, 1966 2 Sheets-Sheet 1

INVENTORS,
CARL J. CAMPAGNUOLO
SHEA O. RUTSTEIN
BY Harry M. Saragovitz,
Edward J. Kelly, Herbert Berl
& J. D. Edgerton
ATTORNEYS April 7, 1970 C. J. CAMPAGNUOLO ET AL 3,504,691

FLUIDIC OSCILLATORY SYSTEM INSENSITIVE TO PRESSURE AND TEMPERATURE

Filed Nov. 18, 1966 2 Sheets-Sheet 2

INVENTORS,
CARL J. CAMPAGNUOLO
SHEA O. RUTSTEIN
BY Harry M. Saragovitz, Edward J. Kelly, Herbert Berl & J. D. Edgerton
ATTORNEYS

United States Patent Office 3,504,691

Patented Apr. 7, 1970

3,504,691

FLUIDIC OSCILLATORY SYSTEM INSENSITIVE TO PRESSURE AND TEMPERATURE

Carl J. Campagnuolo, Chevy Chase, and Shea O. Rutstein, Bethesda, Md., assignors to the United States of America as represented by the Secretary of the Army Filed Nov. 18, 1966, Ser. No. 595,538
Int. Cl. F15c *1/08*
U.S. Cl. 137—81.5 4 Claims

ABSTRACT OF THE DISCLOSURE

A pure fluid oscillator system which can produce an oscillatory output whose frequency is insensitive to pressure and temperature fluctuations of the working medium. The system comprises a temperature insensitive fluid oscillator with its output conduits coupled to the control conduits of a fluid amplifier. The fluid oscillator and fluid amplifier are supplied by the same pressure source.

This invention relates to the pure fluid arts and in particular to a pure fluid oscillator system which can produce an oscillatory output whose frequency is insensitive to pressure and temperature fluctuations of the working medium.

There are many types of oscillators in existence today. Electrical and mechanical oscillators are, of course, among the most well known. However, there are inherent disadvantages in each type of oscillator which limits their applicability. Mechanical oscillators require moving parts in order to achieve an oscillatory output. Wear, friction and thermal expansion adversely affect the reliability of these devices thus limiting their use. Electrical oscillators have the inherent disadvantage of requiring a substantially vibration-free environment which, in certain situations, may be extremely difficult to obtain.

Pure fluid oscillators have only recently been invented and because of their lack of moving parts and inherent simplicity have been replacing mechanical and electrical oscillators in certain applications. The typical fluid oscillator comprises a main fluid nozzle extending into an interaction chamber. Adjacent the main fluid nozzle are two sidewalls (hereinafter referred to as the left and right sidewalls) which along with a splitter positioned opposite the main fluid nozzle define a left and right outlet channel. Left and right control orifices extend through the left and right sidewalls, respectively, and terminate in two control nozzles which have their centerlines passing orthogonally through the centerline of the main fluid nozzle. Left and right feedback channels connect the respective outlets with the respective nozzles.

This type of oscillator has been found to be rugged and dependable in operation eliminating some of the above mentioned disadvantages of the prior art. However, the frequency of a pure fluid oscillator has been found to vary with pressure and temperature fluctuations of the working medium. The problem of eliminating frequency changes in response to temperature fluctuations was only recently solved and is the subject matter of United States patent application Ser. No. 582,481 filed Sept. 26, 1966, for a "Temperature Insensitive Fluid Oscillator" by Joseph M. Kirshner and Carl J. Campagnuolo now Patent No. 3,452,771. A fluid oscillatory system has not yet been designed to render the frequency of the oscillator insensitive to both pressure and temperature fluctuations. Obviously, any oscillator that can produce an output whose frequency is insensitive to temperature and pressure fluctuations will find a wide range of uses in fluid control systems which require a substantially constant frequency and where the pressure and temperature of the working medium cannot be kept constant.

It is therefore an object of this invention to provide a fluid oscillatory system having an output whose frequency is insensitive to pressure and temperature fluctuations of the working medium.

Another object of the present invention is to provide means to render the frequency of a fluid oscillator insensitive to fluctuations in the pressure of the working medium.

Briefly, this invention couples the output conduits of a temperature insensitive fluid oscillator to the control conduits of a fluid amplifier. The fluid oscillator and fluid amplifier are supplied by the same pressure source. Any increase in the pressure to the fluid oscillator will be reflected by an increase of pressure in the power jet of the fluid amplified which will increase the amount of entrainment from the oscillator output conduits keeping the pressure in these conduits constant. Since the pressure in the output conduits will be kept constant the pressure in the feedback section of the oscillator will be constant rendering the frequency of the oscillator insensitive to both pressure fluctuations and temperature fluctuations. The frequency of the fluid oscillator is similarly kept constant for decreases in system pressure.

Other objects and aspects of the invention will be apparent from the following description and drawings wherein.

Figure 1:
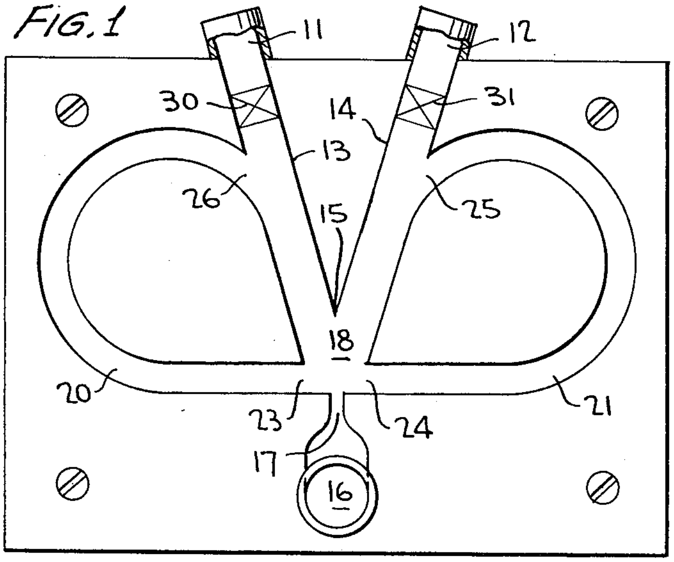
FIG. 1 is a schematic representation of a temperature insensitive oscillator employed in the present invention.

Since the present invention utilizes an oscillator whose frequency is insensitive to temperature changes of the working medium it is desirable to understand this component of the invention in order to better comprehend the overall system into which it is incorporated. A quick review of wave theory will aid in understanding the temperature insensitive oscillator used in the present invention.

Although the speed of sound in free space is proportional to the square root of temperature, the complex speed of wave propagation in a duct is a function of distributed inertance, capacitance, and resistance.

The magnitude of the complex speed of wave propagation in a duct of constant cross-section is given approximately for small wave amplitudes by:

$$|c|^4=\frac{a_4}{1+\frac{R^2}{\omega^2L^2}} \quad (1)$$

where $c$=complex speed of wave propagation
$a$=free speed of sound, proportional to $T^{1/2}$
T=temperature
R=resistance per unit length of duct
$\omega$=angular frequency
L=inertance per unit length R and L in turn are given for a circular duct by $$R \cong 8\pi\mu/A^2$$

$$L = \rho/A$$

where $\mu$=viscosity, approximately proportional to $T^{3/4}$

A=area of the duct $\rho$=density of the fluid used

The density ($\rho$) of the gas can be computed by the ideal gas law as follows:

$$\rho = p/R_g T$$

where $R_g$ is the gas constant for the particular gas used.

In terms of the temperature then, $$|c|^4 = \frac{a_1}{\frac{1}{T^2} + \frac{a_2 T^{3/2}}{\omega_2 A^r p^2}} \quad (2)$$

where $a_1$ and $a_2$ are constants.

An inspection of Equation 2 shows that for $T=O$ and for $T \to \infty, |c|=0$, thus $|c|$ must have a maximum value at at temperature between $T=0$ and $T \to \infty$. Hence, the complex speed of wave propagation $|c|$ should be least sensistive to temperature in the vicinity of the maximum.

It therefore follows that if the complex speed of wave propagation is temperature insensitive the frequency will be temperature insensitive since $$\omega = \frac{2\pi|c|}{l} \quad (3)$$

where $l$ is the path length and $\omega$ is the frequency.

Referring to Equation 2 it can readily be seen that the complex speed of wave propagation ($|c|$) is a maximum when the denominator (D) of the equation is a minimum. Differentiating the denominator (D) and setting it equal to zero, as performed below, will give a temperature ($T_m$) at which the magnitude of the complex speed of wave propagation will be a maximum for a given frequency ($\omega$), a given pressure (P), and a given cross-sectional are (A).

Performing the following algebra:

$$D \equiv \frac{1}{T^2} + \frac{a_2 T^{3/2}}{\omega^2 A^2 p^2}$$

$$\frac{dD}{dT} = -\frac{2}{T^3} + \frac{3a_2 T^{1/2}}{2\omega^2 A^2 p^2}$$

Setting this equal to zero, $$T_m = \left(\frac{4\omega^2 A^2 p^2}{3a_2}\right)^{2/7} \quad (4)$$

The procedure for making the oscillator component of the present invention insensitive to temperature in the vicinity of a given temperature T is to let $T=T_m$ of Equation 4. This determines the value of $\omega$A for a system pressure ($p$). For a given A, this therefore specifies $\omega$. From Equation 2, |c| is then given. Finally Equation 3 is used to specify $l$.

The temperature insensitive range may not be sufficient for the application and can be increased by the following method.

Let $l=l_1+l_2 \cdot\cdot\cdot$ where $l_1$ is the length of one segment of the feedback channel, etc.

From equations 2 and 3 the following result is obtained:

$$\left(\frac{\omega l}{2\pi}\right)^4 = |c|^4 = \frac{a_1}{\frac{1}{T^2} + \frac{a_2 T^{3/2}}{\omega^2 A^2 p^2}}$$

$$\omega^2 = -\frac{a_2 T^{7/2}}{2A^2 p^2} + \frac{1}{2}\sqrt{\frac{a_2^2 T^7}{A^4 p^4} + \frac{4a_1(2\pi)^4 T^2}{l^4}} \quad (6)$$

From Equation 6 for the desired frequency ($\omega$), the given feedback channel segment lenth ($l_1$), the system pressure ($p$) and the selected temperature (T), the cross-sectional area of the duct (A) can be determined. In making the oscillator component of the present invention insensitive to temperature using this method the following steps are necessary.

(1) Select the desired overall feedback length.

(2) Select the desired length of each segment of the feedback channel.

(3) Select the angular frequency for the oscillator consistent with steps 1 and 2 and select the system pressure.

(4) Select a temperature which is in the region the oscillator is to be insensitive for.

(5) From this information use equation 6 to determine the cross-sectional area of the particular segment.

(6) For a second segment perform the same steps but selecting a different temperature. This temperature would also be one where it is desired that the oscillator will be temperature insensitive.

(7) Repeat as necessary to cover the range of temperature that is desired for the oscillator to be insensitive.

It can readily be seen that for a given frequency, the complex speed of wave propagation reaches a maximum at a slightly different temperature for each segment of the feedback channel because of the different cross-sectional areas of each segment. This has the effect of increasing the temperature insensitive region for a complex wave over a feedback channel length and thus increasing the insensitivity of the frequency. Of course, a conduit of continually varying cross-sectional area could be used.

In FIG. 1, an oscillator 10 designed to be temperature insensitive has output channels 11 and 12. Output channel 11 is formed in part by a side wall 13 while output channel 12 is formed in part by a side wall 14. Side walls 13 and 14 form a V and meet at splitter 15. Power is supplied to oscillator 10 by a source 16 which communicates with an interaction chamber 18 by a power nozzle 17. Each output channel communicates with the interaction chamber 18. A left control port 23 and a right control port 24 are opposite each other and adjacent nozzle 17. A left feedback port 26 communicates with output channel 11 downstream of interaction chamber 18 and communicates with left control port 23 by a left feedback channel 20 which is of constant cross-sectional area. A right feedback channel 21 of constant cross-sectional area communicates with a right feedback port 25 and a right control port 24. Adjustable resistances 30, 31 are present in each output channel to help tune the oscillator by controlling the pressure therein. In the embodiment of FIG. 1 the length of feedback channels 20 and 21 are for a given frequency, pressure and cross-sectional area determined from Equations 2, 3, and 4 to provide a substantially temperature insensitive oscillator.

Figure 2:
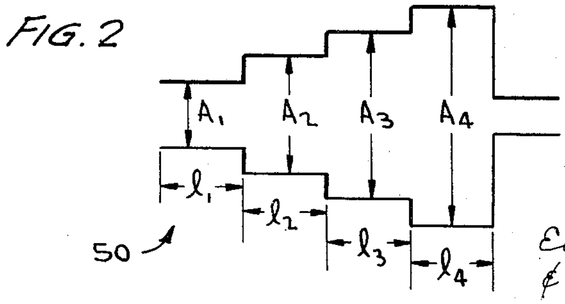
FIG. 2 is a schematic representation of a modification of the temperature insensitive oscillator of FIG. 1

In FIG. 2 a cross-sectional view of a feedback channel 50 is illustrated. In this temperature insensitive oscillator the length of the feedback channel is broken up into segments $l_1$, $l_2$, . . . with the entire length of the feedback channel being equal to the sum of the particular segments. Each segment $l_1$, $l_2$, . . . has a cross-sectional area $A_1$, $A_2$, . . . different from the next cross-sectional area and for equal segment lengths the areas of each segment will increase in size from the feedback port to the control port along the length of the feedback channel. The areas of the feedback channels can be computed as previously described.

Figure 3:
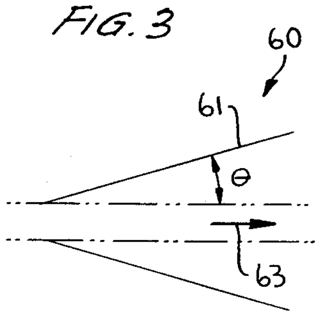
FIG. 3 is a schematic representation of another mod'fication of the temperature insensitive fluid oscillator of FIG. 1.

In FIG. 3, a diverging duct 60 is shown which is formed by wall 61. The wall 61 forms an angle $\theta$ with a horizontal datum which is a measurement of the divergence of the duct. The diverging duct can be used in place of segmented feedback channels as it is of simplier construction.

Figure 4:
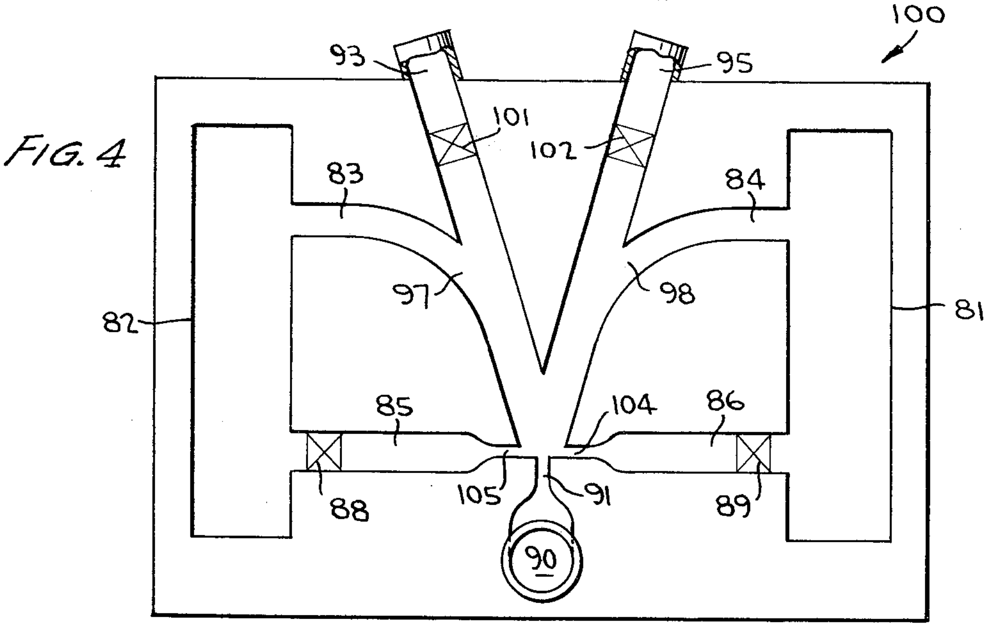
FIG. 4 is a schematic representation of still another modification of the temperature insensitive fluid oscillator of FIG. 1.

In FIG. 4, an oscillator 100 is designed as a lumped parameter circuit. A left output channel 93 communicates with a left fluid capacitance 82 by a port 97 and a conduit 83, while a right output channel 95 communicates with a right fluid capacitance 81 by a port 98 and a conduit 84. Left capacitance 82 communicates with an interaction chamber 99 of oscillator 100 by conduit 85 and control nozzle 105, while right capacitance 81 communicates with interaction chamber 99 by a conduit 86 and control nozzle 104. Conduit 85 has a variable resistance 88 in it while conduit 86 has a variable resistance 89 in it. Variable resistors 101 and 102 are in the respective output channels to vary the load therein.

In the temperature insensitive oscillator of FIG. 1 and the embodiments of FIGS. 2 and 3, distributed parameters have been relied on. In these embodiments a certain length of channel was used having a particular fluid capacitance and resistance. In FIG. 4, these distributed parameters have been lumped. The total fluid capacitance of the various channels of FIGS. 1, 2, and 3 have been replaced by one fluid capacitance, while the various resistances of each segment of feedback channel have been replaced by one variable resistance producing the same circuit mathematically only with different elements.

The oscillator 100 can be tuned by varying resistances 88 and 89 until a temperature insensitive region is obtained.

Figure 5:
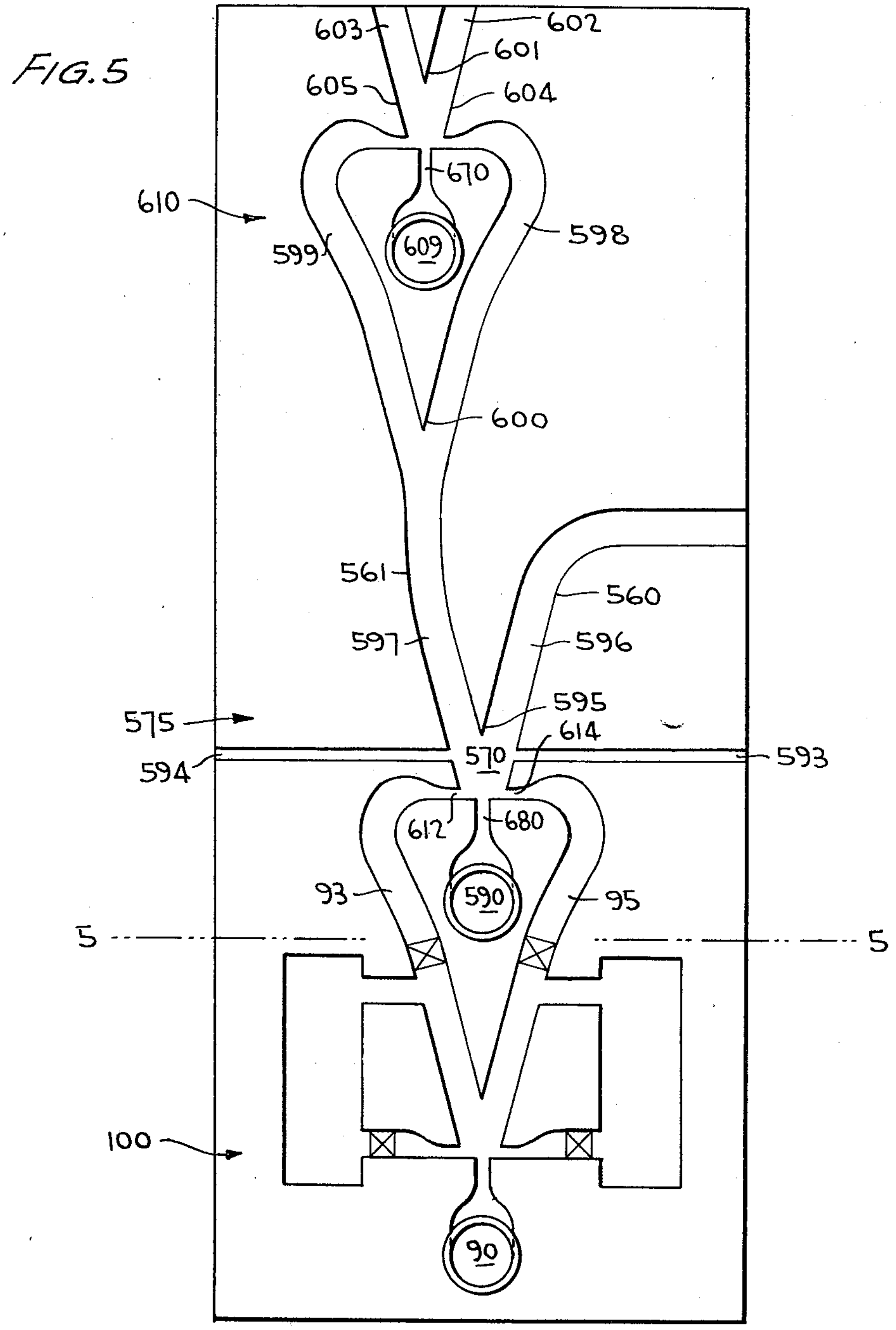
FIG. 5 is a schematic representation of a temperature and pressure insensitive system in accordance with the present invention.

In FIG. 5 the output conduits 93 and 95 of temperature insensitive fluid oscillator 100 lead to a left control nozzle 612 and a right control nozzle 614, respectively of a fluid amplifier 575. Oscillator 100 is shown as being a lumped parameter type but any of the fluid oscillators disclosed could be used. It is further envisioned that if it were desirable to render an oscillator pressure insensitive, without regard to temperature affects, any fluid oscillator could be used. A common source of pressure communicates with oscillator 100 at inlet 90 and amplifier 575 at inlet 590. Inlet 590 communicates with an interaction chamber 570 by a power nozzle 680. A left sidewall 561 and a right sidewall 560 surround interaction chamber 570 and along with a splitter 595 serve to define a left output passage 597 and a right output passage 596. A left bleed 594 and a right bleed 593 communicate with the interaction chamber and both bleeds also communicate with a pressure sink. Left output passage 597 leads to a conventional pulse converter 610 which communicates with a source of pressure (not shown) at inlet 609. It is not necessary that the same pressure source as is used for the oscillator and amplifier be used for the pulse converter. A left output passage 603 and a right output passage 602 are separated by a splitter 601. Legs 599 and 598 communicate with conduit 597 and act to selectively control power fluid from inlet 609 and a power nozzle 670 to either of the outlet passages.

Temperature insensitive fluid oscillator 100 will alternately direct fluid to conduits 93 and 95 in accordance with well known theory. Assuming fluid is directed to conduit 93 it will be directed by control nozzle 612 to impinge against the power fluid from nozzle 680 directing the power fluid out right output conduit 596. As the power fluid from power nozzle 680 flows past control nozzle 614 it will entrain fluid from the control nozzle and hence tend to reduce the pressure in leg 95. If the pressure supplied to oscillator 100 increases the pressure issued from power nozzle 680 will also increase which will increase the amount of fluid entrained in leg 95. This will correspondingly reduce the pressure in oscillator leg 95 tending to entrain more of the oscillating power stream of oscillator 100 which is being directed out leg 93 eliminating any pressure changes in the leg and hence removing pressure fluctuations from the oscillator. An opposite result would occur for a pressure decrease to amplifier 575 and oscillator 100. Amplifier 575 will alternately direct power fluid to output conduits 597 and 596 in accordance with which leg of the oscillator is being pressurized. If leg 93 is pressurized, amplifier 575 will direct fluid from power source 590 out right output conduit 596 while an opposite result will occur if leg 95 is pressurized. Pressure to output conduit 597 will go to a pulse converter 610 from where it will alternately direct power fluid from source 609 to conduits 603 and 602 in a manner well known in the art. The temperature and pressure insensitive oscillatory fluid output will be supplied by either conduit 603 or 602. A temperature and pressure insensitive fluid output could be obtained from either conduit 597 or conduit 596 but it has been experimentally determined that the cascading of pulse converters in series with one of the output conduits of the fluid amplifier 575 gives improved performance in reducing temperature and pressure effects on the frequency of the oscillatory output. While one pulse converter is shown it is obvious that several could be used.

While we have oscillator 100 as being temperature insensitive it is envisioned that any oscillator could be coupled to a fluid amplifier as we have shown if it were desired to make the system temperature sensitive but pressure insensitive.

We wish it to be understood that we do not desire to be limited to the exact details of construction shown and described, for obvious modifications will occur to persons skilled in the art.

We claim as our invention:

1. A fluid oscillatory system comprising:

(a) a pure fluid oscillator having a source of pressure fluid, a power nozzle to receive said pressure fluid and at least two output conduits to receive said pressure fluid from said power nozzle, means to alternately direct said pressure fluid to one of said output conduits from said power nozzle at particular frequency including a pair of control ports positioned opposite each other and adjacent said power nozzle, (b) a fluid amplifier having a power nozzle, said source of pressure fluid communicated to said power nozzle, an interaction chamber positioned to receive said pressure fluid from said power nozzle, a pair of control means positioned opposite each other and adjacent said power nozzle, a pair of output conduits communicating with said interaction chamber, (c) said oscillator output conduits being coupled to said amplifier control means, and (d) said fluid oscillator including means to render said frequency insensitive to changes in temperature of said pressure fluid.

2. A device according to claim 1 wherein a pulse converter is coupled to one of said output conduits of said fluid amplifier.

3. A device according to claim 1 wherein a pair of bleed communicate with said interaction chamber and are axially opposite to each other.

4. A device according to claim 1 wherein said oscillator means to alternately direct said oscillator pressure fluid to one of said oscillator output conduits at a particular frequency includes said means to render said frequency temperature insensitive.

References Cited

UNITED STATES PATENTS

| | | | |
|---|---|---|---|
| 3,001,698 | 9/1961 | Warren | 137—81.5 |
| 3,093,306 | 6/1963 | Warren | 137—81.5 |
| 3,158,166 | 11/1964 | Warren | 137—81.5 |
| 3,180,575 | 4/1965 | Warren | 137—81.5 |
| 3,185,166 | 5/1965 | Horton et al. | 137—81.5 |
| 3,228,410 | 1/1966 | Warren et al. | 137—81.5 |
| 3,237,859 | 3/1966 | Hatch | 137—81.5 |
| 3,239,027 | 3/1966 | Schuck | 137—81.5 |
| 3,283,768 | 11/1966 | Manion | 137—81.5 |

OTHER REFERENCES

I.B.M. Technical Disclosure Bulletin, "Electric to Pneumatic Transducer," vol. 6, No. 3, p. 60, August 1963.

M. CARY NELSON, Primary Examiner

W. R. CLINE, Assistant Examiner